US010597003B2

(12) United States Patent
Poton et al.

(10) Patent No.: US 10,597,003 B2
(45) Date of Patent: Mar. 24, 2020

(54) INTERMEDIATE PIECE FOR CONNECTING A WIPER TO A DRIVING ARM FOR DRIVING A WINDSCREEN WIPER

(71) Applicant: Valeo Systèmes d'Essuyage, Le Mesnil Saint Denis (FR)

(72) Inventors: Eric Poton, Pont du Chateau (FR); Vincent Gaucher, Ennezat (FR); Stéphane Houssat, Blanzat (FR)

(73) Assignee: Valeo Systémes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 15/351,536

(22) Filed: Nov. 15, 2016

(65) Prior Publication Data
US 2017/0136996 A1 May 18, 2017

(30) Foreign Application Priority Data
Nov. 17, 2015 (FR) ..................... 15 61076

(51) Int. Cl.
 B60S 1/38 (2006.01)
 B60S 1/40 (2006.01)
 B60S 1/34 (2006.01)
(52) U.S. Cl.
 CPC ........... *B60S 1/3851* (2013.01); *B60S 1/3488* (2013.01); *B60S 1/3849* (2013.01); *B60S 1/40* (2013.01);
(Continued)
(58) Field of Classification Search
 CPC .... B60S 1/4064; B60S 1/4048; B60S 1/4045; B60S 1/40; B60S 1/3865; B60S 1/3858;
(Continued)

(56) References Cited

U.S. PATENT DOCUMENTS

| | | | | |
|---|---|---|---|---|
| 1,460,593 | A | * | 7/1923 | Lemoigne .............. B25G 1/007 279/14 |
| 1,703,181 | A | * | 2/1929 | Tarver ................... B60S 1/3849 15/250.33 |
| 1,812,744 | A | * | 6/1931 | Glenn ....................... B43L 5/00 248/282.1 |

(Continued)

FOREIGN PATENT DOCUMENTS

| | | |
|---|---|---|
| DE | 103 26 266 A1 | 1/2004 |
| EP | 2179901 A2 | 4/2010 |

(Continued)

OTHER PUBLICATIONS

Machine translation of description portion of French publication 2854851, published Nov. 2004 (Year: 2004).*

(Continued)

*Primary Examiner* — Gary K. Graham
(74) *Attorney, Agent, or Firm* — Osha Liang LLP (57) ABSTRACT

The invention relates to an intermediate piece 101 intended to be interposed between a connector 8 that is able to carry a wiper and a connecting element 203 of a driving arm, the connector 8 comprising at least one receiving bearing 15 for receiving a first shaft 102, the connecting element 203 comprising at least one receiving orifice 215 for receiving a second shaft 103, characterized in that the intermediate piece 101 is equipped with the first shaft 102 and the second shaft 103.

Application to motor vehicles.

10 Claims, 6 Drawing Sheets

(52) U.S. Cl.
CPC ........... *B60S 1/4045* (2013.01); *B60S 1/4048* (2013.01); *B60S 1/4064* (2013.01); *B60S 1/4041* (2013.01); *B60S 2001/4051* (2013.01)

(58) Field of Classification Search
CPC .... B60S 1/3868; B60S 1/3867; B60S 1/3849; B60S 1/3851; B60S 2001/4051; Y10T 403/32081
USPC .............................. 15/250.32; 403/54, 62, 67
See application file for complete search history.

(56) References Cited

U.S. PATENT DOCUMENTS

| | | | | |
|---|---|---|---|---|
| 1,872,095 | A * | 8/1932 | Romano | B60S 1/3856 15/250.32 |
| 2,036,155 | A * | 3/1936 | Luckanich | B60S 1/3805 15/250.07 |
| 2,324,894 | A * | 7/1943 | Whitted | B60S 1/34 15/250.23 |
| 2,522,625 | A * | 9/1950 | Lundgren | D03C 9/0683 139/88 |
| 2,576,077 | A * | 11/1951 | Ozarowski | B60S 1/34 15/250.19 |
| 2,821,735 | A * | 2/1958 | Perkins | B60S 1/3406 15/250.23 |
| 2,946,078 | A * | 7/1960 | Deibel | B60S 1/4038 15/250.32 |
| 3,623,756 | A * | 11/1971 | Fischer | A63H 33/042 403/57 |
| 3,874,019 | A * | 4/1975 | Speth | B60S 1/28 15/250.32 |
| 8,469,623 | B2 * | 6/2013 | Luyendijk | E02F 3/364 37/468 |
| 2012/0233802 | A1 * | 9/2012 | Depondt | B60S 1/387 15/250.33 |
| 2014/0096336 | A1 | 4/2014 | Boland | |

FOREIGN PATENT DOCUMENTS

| | | | |
|---|---|---|---|
| FR | 2854851 | * | 11/2004 |
| GB | 650311 | * | 2/1951 |
| GB | 665359 | * | 1/1952 |

OTHER PUBLICATIONS

Preliminary Report Issued in Corresponding French Application No. 1561076, dated Aug. 11, 2016 (6 Pages).

* cited by examiner

INTERMEDIATE PIECE FOR CONNECTING A WIPER TO A DRIVING ARM FOR DRIVING A WINDSCREEN WIPER

The present invention concerns wiping systems for motor vehicles, and relates more particularly to a connecting device between a wiper and a driving arm which are constituent parts of the wiping system.

Wiping systems, commonly known as windscreen wipers, for motor vehicles are designed to remove liquids and dirt which can disrupt the driver's view of his surroundings, by wiping. These windscreen wipers generally comprise a driving arm which carries out an angular back-and-forth movement about a rotation axis, and an elongate wiper equipped with a squeegee blade made of a resilient material. By rubbing against a, front or rear, glazed surface of the motor vehicle, the squeegee blade wipes the water and some of the dirt therefrom, and evacuates them from the driver's field of view.

Regardless of the configuration of the wiper, that is to say either a wiper having articulated brackets which retain the squeegee blade in several distinct zones, or a wiper having a metal blade which holds the squeegee blade along its entire length, the wiper is attached to the driving arm by a connecting device which comprises at least one connector secured to the wiper.

In a first known manner of connecting, an adapter, which is able to be joined to the connector of the wiper, is fitted on an end piece of the driving arm. The connector is mounted so as to be able to rotate on a bracket that the adapter comprises. This first manner of connecting is commonly used for windscreen wipers intended for glazed surfaces situated at the front of the motor vehicle (windscreen). In a second known manner of connecting, the connector is attached to a shaft secured to the driving arm. This second manner of connecting is commonly encountered in windscreen wipers intended for glazed surfaces situated at the rear of the vehicle (rear window).

The closest prior art is formed by the document FR2847221, which describes a windscreen wiper comprising a connector which is intended to carry the wiper. The connector comprises a base and a body which extends above the base. The base comprises means for securing the connector to the wiper.

According to one variant, the body comprises two receiving bearings for receiving a shaft carried by the driving arm. According to another variant, the body comprises two trunnions that are intended to be accommodated inside respective orifices formed inside the driving arm.

In other words, the connecting device in the document FR2847221 allows for two different ranges of connector which are able to be mounted on two different ranges of driving arm. However, these two ranges are not compatible, and so a wiper equipped with a first type of connector cannot be mounted on a driving arm configured to receive a second type of connector. The technical problem thus lies in the impossibility of standardizing a particular design of wiper.

To this end, the subject of the invention is an intermediate piece intended to be interposed between a connector that is able to carry a wiper and a connecting element of a driving arm, the connector comprising at least one receiving bearing for receiving a first shaft, the connecting element comprising at least one receiving orifice for receiving a second shaft, characterized in that the intermediate piece is equipped with the first shaft and the second shaft. These two shafts are advantageously offset so as each to form a rotation means.

The intermediate piece advantageously has at least one of the following features, on their own or in combination:
the first shaft and the second shaft extend along different axes that are parallel to one another,
the shafts are able to form male rotation means with regard to the connector and the connecting element,
the intermediate piece advantageously comprises a first bracket that carries the first shaft,
this first bracket may have a "U"-shaped section and comprise a base from which at least two first longitudinal walls extend,
each first longitudinal wall is delimited by a first external face from which a first trunnion protrudes,
the first trunnions together form the first shaft,
the intermediate piece may comprise a second bracket that carries the second shaft,
this second bracket may have a "U"-shaped section and comprise a base from which at least two second longitudinal walls extend,
each second longitudinal wall is delimited by a second external wall from which a second trunnion protrudes,
the second trunnions together form the second shaft,
the abovementioned first bracket and the second bracket presented above are mounted head-to-tail by way of a base that is common to the two brackets,
the first bracket, the second bracket, the first shaft and the second shaft form a single piece produced in one and the same manufacturing operation,
the intermediate piece has a "Y"-shaped section and comprises a plate from which the second shaft protrudes on either side of the plate,
the plate is provided parallel to the first longitudinal walls,
the plate comprises two external surfaces that are each equipped with a second trunnion,
the second trunnions extending from the plate together form the second shaft.

The invention also covers a connector that is able to carry a wiper and comprises at least one receiving bearing, said connector being mounted rotationally on an intermediate piece as described in detail in the present document.

The invention also covers a driving arm comprising an intermediate piece as described in detail in the present document. The intermediate piece may be mounted rotationally with respect to the driving arm.

The invention is aimed at a wiper comprising an intermediate piece as described in detail in the present document. The intermediate piece may be mounted rotationally with respect to the wiper. Such a wiper may comprise a connector interposed between the intermediate piece and a structural element of the wiper.

Finally, the invention covers a wiping system comprising a wiper as described in detail above and an abovementioned driving arm that drives the wiper in rotation.

Further features, details and advantages of the invention will become more clearly apparent from reading the description given below by way of illustration and with reference to the following figures, in which.

In the figures, the denominations longitudinal, lateral, transverse, vertical, above, below refer to the orientation of a wiper 1 illustrated in FIG. 1. A longitudinal direction corresponds to a longitudinal axis X along which the wiper 1 extends. A transverse direction corresponds to that of a transverse axis Y which is perpendicular to the longitudinal axis X and to a rotation axis $A_r$ of a constituent driving arm 2 of a wiping system 3. This transverse axis is parallel to a rotation axis Y between the wiper and the driving arm. A vertical direction, parallel to that of a vertical axis Z, and the denominations upper or lower relate to orientations parallel to the rotation axis $A_r$ of the driving arm 2 of the wiping system 3, the denomination lower containing the plane of the windscreen.

The directions mentioned above are illustrated in an orthonormal frame of reference Oxyz shown in the figures. In this frame of reference, the axis Ox represents the longitudinal direction, the axis Oy represents the transverse direction, and the axis Oz represents the vertical direction.

Figure 1:
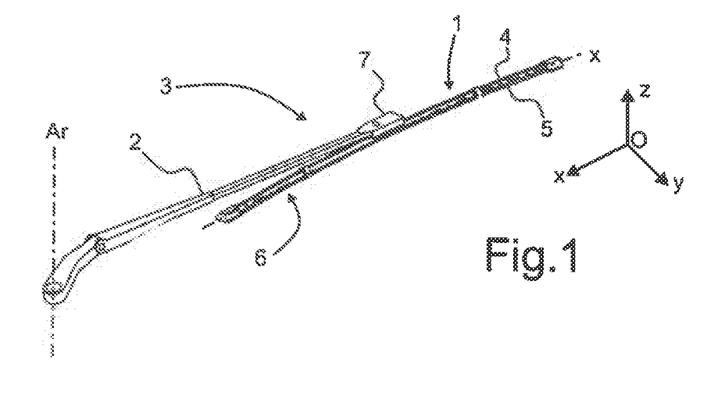
FIG. 1 is a perspective view of a wiping system according to the invention.

In FIG. 1, a motor vehicle is commonly equipped with the wiping system 3 for evacuating water and/or dirt present on a glazed surface, notably a rear window of the motor vehicle. The wiping system 3 comprises a driving arm 2 which is able to carry out an angular back-and-forth movement along and over the glazed surface. The glazed surface is either a front windscreen or a rear window with which the motor vehicle is equipped.

The wiping system 3 also comprises the wiper 1 which extends along a main axis, known as the longitudinal axis X parallel to the axis Ox. The wiper 1 comprises at least one air deflector 4 and a squeegee blade 5. The air deflector 4 is provided to convert a pressure applied by an airflow flowing along the glazed surface into a pressing force pressing the wiper 1 against the glazed surface of the motor vehicle. The squeegee blade 5 is the piece of the wiper 1 that is in direct contact with the glazed surface to evacuate the water and/or dirt present on the latter. The air deflector 4 and the squeegee blade 5 form a semi-rigid assembly 6 which is carried by a connecting device 7 interposed between the driving arm 2 and the semi-rigid assembly 6.

The connecting device 7 provides a mechanical connection between the driving arm 2 and the wiper 1 and thus makes it possible to separate the wiper 1 from the driving arm 2 in order to replace the wiper 1.

Figure 2:
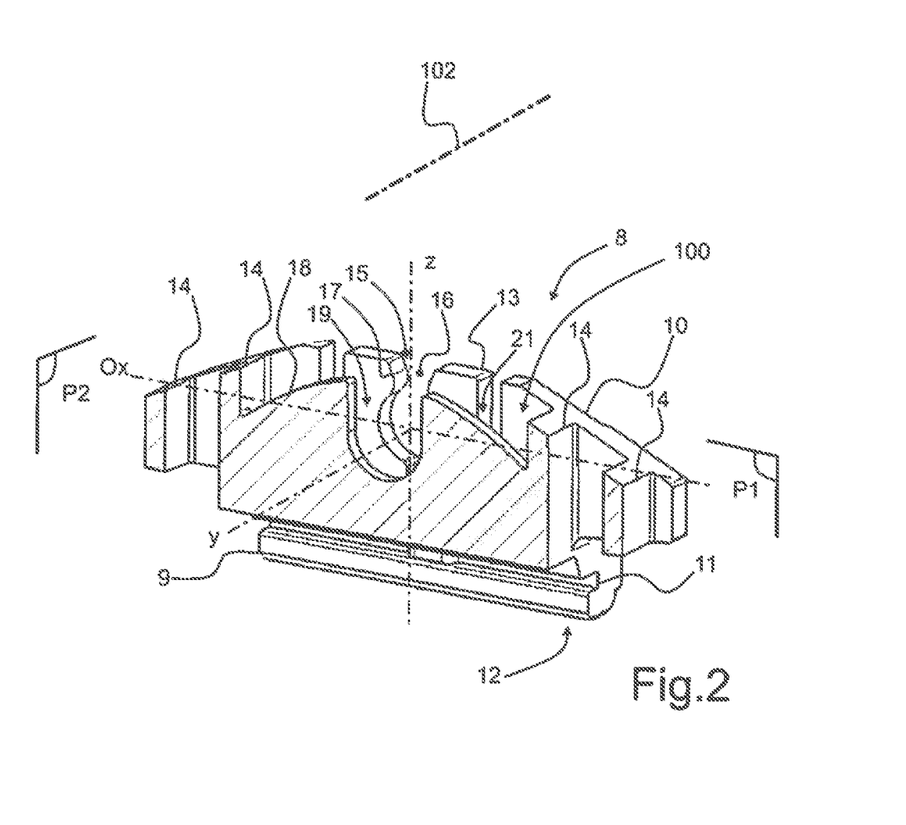
FIG. 2 is a perspective view in median and longitudinal section of a connector according to the invention which is part of the wiping system illustrated in FIG. 1, FIGS. 3 and 4 are perspective views at two different angles of the connector illustrated in FIG. 2.

Referring now to FIG. 2, the connecting device 7 interacts for example with a connector 8 shown in a median longitudinal section along the longitudinal axis Ox of the wiper 1. The connector 8 comprises a base 9 which extends in the longitudinal and transverse directions, and a body 10 which extends, above the base 9, substantially in the vertical direction. The body 10 is thus positioned on top of the base 9. According to the embodiment shown in the figures, the connector taken as a whole, has a first, longitudinal and vertical, plane of symmetry $P_1$ parallel to the plane Oxz of the orthonormal frame of reference defined above, and substantially medial in the transverse direction. According to one embodiment of the invention, the connector 8 is produced by moulding a polymer material, for example a material from the polyoxymethylene family, known under the acronym POM, or by moulding a mixture of polymer materials, for example a mixture of polymers from the polycarbonate family and the acrylonitrile butadiene styrene family, known under the acronym ABS. Further materials that are known to a person skilled in the art, such as PBT 30GF, may also be used.

The base 9 comprises means for securing or fastening the connector 8 to the wiper 1. These securing means take the form of a first and a second groove 11 that are formed in lower lateral parts of the base 9, each delimiting, in the lower lateral part of this base 9, a hook 12 that is able to engage with the wiper 1. Only one groove 11 is shown in FIG. 2, the second groove being formed in the symmetrical part of the base 9 with respect to the first, longitudinal vertical, plane of symmetry $P_1$ of the connector 8.

Figure 3:
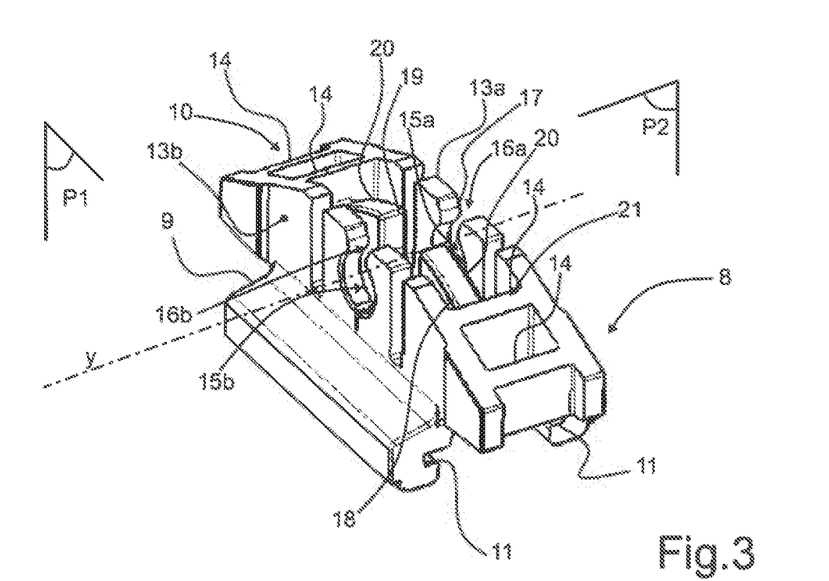
Figure 4:
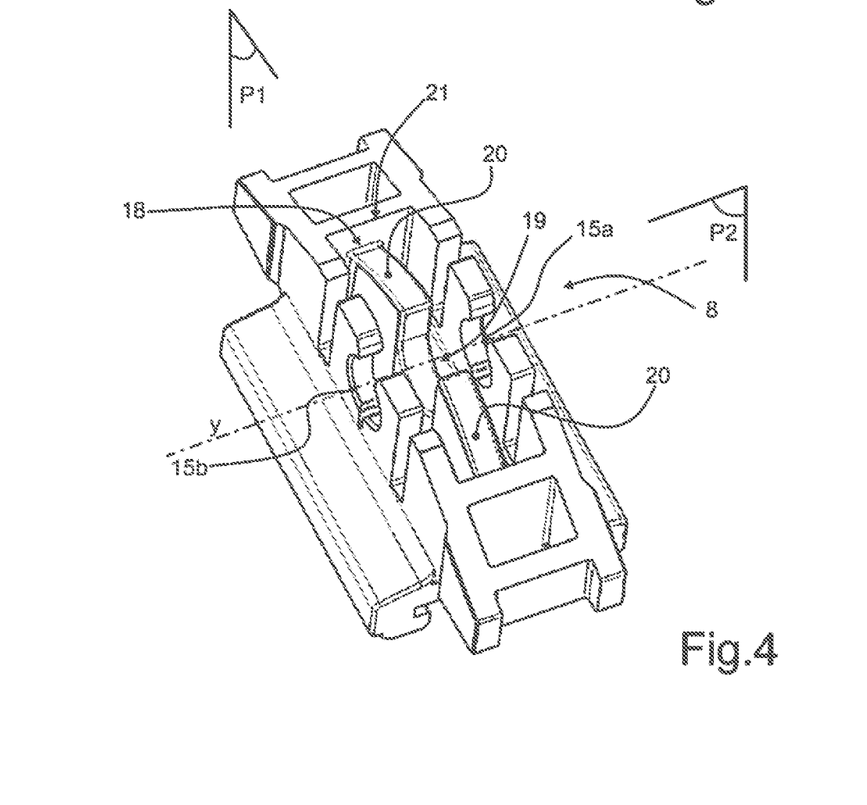

The body 10, which is advantageously made as one with the base 9, extends above the latter in the vertical direction. Referring also to FIGS. 3 and 4, the body 10 has a width in the transverse direction which is less than a width in the transverse direction of the base 9.

The body 10 furthermore has a longitudinal dimension that is substantially equal to or greater than the longitudinal dimension of the base 9. According to the embodiment of the invention that is illustrated in the figures, the longitudinal dimension of the body 10 is greater than that of the base 9. The connector 8 has a second, transverse and vertical, plane of symmetry $P_2$ parallel to the plane Oyz of the orthonormal frame of reference defined above and substantially medial along the longitudinal axis Ox.

The body 10 has substantially vertical first and second lateral flanks 13 that are disposed symmetrically with respect to the first plane of symmetry $P_1$ of the connector 8. Each of these lateral flanks 13 is substantially flat, with a small thickness in the transverse direction, and the width measured between these two lateral flanks 13 represents the dimension, in the transverse direction, of the body 10 of the connector 8. Therefore, the first and second lateral flanks 13 delimit an internal volume 100 of the connector 8 between one another. Towards the longitudinal ends of the body 10, the first and second lateral flanks 13 are connected together by a set of ribs 14, which act notably as reinforcements for the body 10. More particularly, the connector 8 has two pairs of identical ribs 14, which are formed symmetrically with respect to a transverse median plane of the connector, this median plane being parallel to the second plane of symmetry $P_2$.

As FIG. 2 shows, each of the first and second lateral flanks 13 essentially has, as seen from the side, a profile such that the upper surface of each of these lateral flanks 13 forms, in its central part in the longitudinal direction of the connector 8, a slope that descends in the direction of each of the longitudinal ends thereof. This shape makes it possible both to lighten the connector 8 and to make it easier to join it to an intermediate piece 101 shown in FIGS. 6 to 12.

Formed through each of the first and second lateral flanks 13 is a receiving bearing for receiving a rotation means 102 for the intermediate piece 101, this rotation means being illustrated in this case by a broken line which passes through the centre of this rotation means 102.

FIGS. 3 and 4 illustrate a first receiving bearing 15*a* formed in the first lateral flank 13*a*, and a second receiving bearing 15*b* which can be formed in the second lateral flank 13*b*. Each of the receiving bearings 15 has a substantially cylindrical shape and is a through-bearing, that is to say it extends transversely through the entire thickness of each of the lateral flanks 13. The inside diameter of each of the receiving bearings 15*a*, 15*b* is defined with respect to a mean diameter of a first shaft 102 of the intermediate piece 101, the connector 8 being intended to be connected to said first shaft 102. The centres of the two receiving bearings 15*a*, 15*b* that are arranged in the first lateral flank 13*a* and in the second lateral flank 13*b*, respectively, are aligned along the transverse axis Y parallel to the direction of the axis Oy of the orthonormal frame of reference defined above. The transverse axis Y embodies the rotation axis of the wiper 1 with respect to the driving arm 2, once the first shaft 102 is accommodated inside the receiving bearings 15*a*, 15*b* of the connector 8.

Each of the receiving bearings 15*a*, 15*b* is positioned substantially in the central zone of the corresponding lateral flank, in the longitudinal direction. According to the embodiment illustrated in the figures, the transverse axis Y along which the centres of these receiving bearings 15*a*, 15*b* are aligned is thus comprised within the second, transverse vertical, plane of symmetry $P_2$ of the connector 8. In the vertical direction, each of the receiving hearings 15*a*, 15*b* advantageously extends substantially in the central zone of the body 10 of the connector 8. Each of these receiving bearings 15*a*, 15*b* is thus arranged on one or the other of the first or second lateral flanks 13*a*, 13*b* such that, for the one part, material of the corresponding lateral flank 13*a* remains above the receiving bearing 15, and such that, for the other part, material of the corresponding lateral flank 13*a* remains below said receiving bearing 15, between its lowest point and the upper face of the base 9 of the connector 8.

In order to allow the first shaft 102 that is secured to the intermediate piece 101 to be accommodated and held in the connector 8, that is to say, for example, simultaneously in the receiving bearings 15*a*, 15*b* that are arranged in the first and the second lateral flank 13*a*, 13*b*, respectively, an inlet opening 16*a*, 16*b* is formed in line with each of these receiving bearings 15*a*, 15*b*, above the latter. The longitudinal dimension of each of the inlet openings 16 is less than the inside diameter of the receiving bearing 15 to which the inlet opening 16 provides access and into which the inlet opening 16 leads. In other words, each inlet opening 16*a*, 16*b* forms an access cone to the corresponding receiving bearing 15*a*, 15*b*. A first inlet opening 16*a* thus forms an access cone to the first receiving bearing 15*a* arranged in the first lateral flank 13*a*, and a second inlet opening 16*b* forms an access cone to the second receiving bearing 15*b* arranged in the second lateral flank 13*b*. Thus, when the first shaft 102 is accommodated simultaneously in the receiving bearings 15*a*, 15*b*, said first shaft 102 is then held therein in the vertical direction Oz. In order to make it easier to insert the first shaft 102 into the inlet openings 16*a*, 16*b* and to fit this first shaft 102 in the receiving bearings 15*a*, 15*b*, chamfers 17 are formed on each of the inlet edges bordering each of the inlet openings 16. The smallest longitudinal dimension of the inlet opening 16 is strictly less than the diameter of the first shaft 102.

As can be seen in FIGS. 2 to 4, the body 10 of the connector 8 also has, within the internal volume 100 delimited by the first and second lateral flanks 13*a*, 13*b*, a guide plate 18 which extends substantially longitudinally and vertically from the upper face of the base 9. According to the embodiment illustrated in the figures, the guide plate 18 is positioned, in the transverse direction, substantially in the median part of the internal volume 100. It thus extends in this case substantially along the first, longitudinal vertical, plane of symmetry $P_1$ of the connector 8.

The guide plate 18 is also advantageously positioned substantially centrally in the longitudinal direction of the connector 8. Advantageously, the profile of an upper surface of the guide plate 18 is arched or curved with a virtual centre positioned substantially level with the wiper blade of the wiper when the connector 8 is secured to this wiper. According to an exemplary embodiment of the invention, the dimension of the guide plate 18 in the vertical direction is less than that of each of the lateral flanks 13*a*, 13*b*, measured in their central part in the longitudinal direction Ox.

A guide notch 19 is formed in the upper part of the guide plate 18 substantially in the central part in the longitudinal direction. This guide notch 19 leads onto the upper surface of the guide plate 18. More specifically, the guide notch 19 is designed such that it substantially forms, in its lower part, a half-cylinder which is centred on the transverse axis Y that passes through the centres of the first and second rotation bearings 15*a*, 15*b*. The diameter of this half-cylinder is greater than that of the rotation bearings 15. According to the embodiment illustrated in the figures, this half-cylinder extends vertically towards the upper surface of the guide plate 18 over a longitudinal dimension substantially equal to its diameter. According to other, alternative embodiments, the guide notch 19 may flare slightly in the direction of the upper surface of the guide plate 18.

On either side of the guide notch 19, the guide plate 18 comprises guide uprights 20 which delimit notably the guide notch 19 and are distributed longitudinally on either side of the guide notch 19. In other words, the guide uprights 20 are material elements of the guide plate 18 which delimit the guide notch 19.

Figure 5:
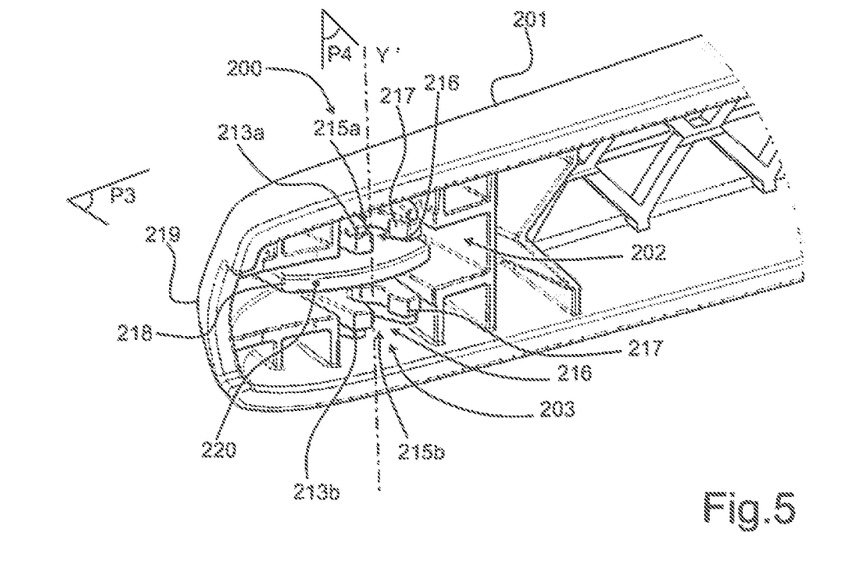
FIG. 5 is a perspective view of one end of a driving arm to which the connector illustrated in FIGS. 2 to 4 is indirectly attached.
Figure 6:
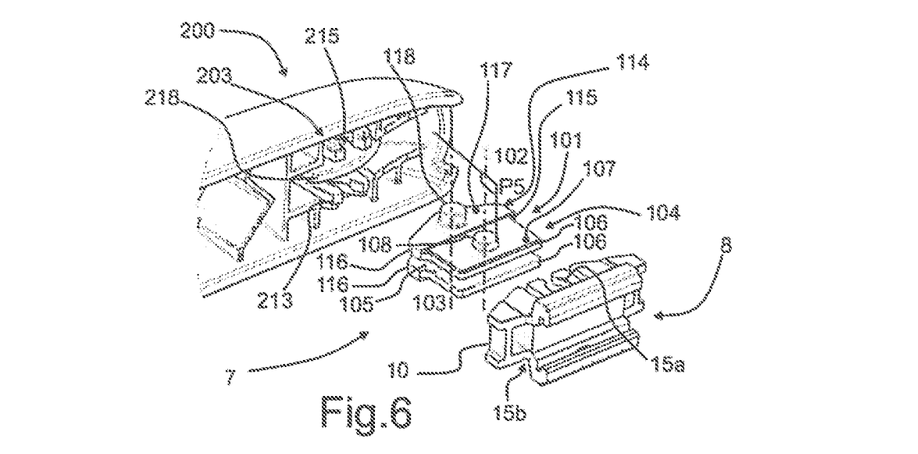
FIG. 6 is an exploded perspective view of the end of the driving arm illustrated in FIG. 5 and of the connector illustrated in FIGS. 2 to 4, between which an intermediate piece of the present invention is interposed.

FIGS. 5 and 6 show a terminal end 200 of the driving arm 2. The terminal end 200 is either attached to the driving arm 2 or produced as one with the driving arm 2, the material advantageously being an injection-mouldable synthetic material. The driving arm 2 is formed in a longitudinal plane of symmetry $P_3$. The terminal end 200 comprises a shell 201 which delimits an internal space 202 from the environment surrounding the terminal end 200. The internal space 202 accommodates a connecting element 203 which has a shape comparable or even identical to that of the body 10 of the connector 8.

Thus, the connecting element 203 comprises first and second lateral uprights 213 which are disposed symmetrically with respect to the third plane of symmetry $P_3$ of the driving arm 2, extend in the internal space 202, and are substantially parallel and for example vertical. Each of these lateral flanks 213 is substantially flat, with a small thickness in the transverse direction Oy, and the width measured between these two lateral flanks 213 represents the dimension, in the transverse direction, of the connecting element 203 of the driving arm 2. Therefore, the first and second lateral uprights 213 delimit an internal volume of the connecting element 203 between one another.

Formed through each of the first and second lateral uprights 213 is a receiving orifice 215 for receiving a second shaft 103 of the intermediate piece 101. A first receiving orifice 215*a* is thus formed in the first lateral upright 213*a*, and a second receiving orifice 215*b* can be formed in the second lateral upright 213*b*. Each of the receiving orifices 215 has a substantially cylindrical shape and is a through-orifice, that is to say it extends transversely through the entire thickness of each of the lateral uprights 213. The inside diameter of each of the receiving orifices 215 is defined with respect to a mean diameter of the second shaft 103 of the intermediate piece 101, the driving arm 201 being intended to be connected to said second shaft 103. The centres of the two receiving orifices 215a, 215b that are arranged in the first lateral upright 213a and in the second lateral upright 213b, respectively, are aligned along a transverse axis Y'. The transverse axis Y' embodies the rotation axis of the intermediate piece 101 with respect to the driving arm 2, once the second shaft 103 is accommodated inside the receiving orifices 215a, 215b of the connecting element 203 of the driving arm 201.

Each of the receiving orifices 215a, 215b is positioned substantially in the central zone between the lateral uprights 213a and 213b, in the transverse direction Oy. According to the embodiment illustrated in the figures, the transverse axis Y' along which the centres of these receiving orifices 215a, 215b are aligned is thus comprised within a fourth, transverse, plane of symmetry $P_4$ of the connecting element 203. The fourth plane of symmetry $P_4$ is notably orthogonal to the third plane of symmetry $P_3$. In a transverse direction comprised within the fourth plane of symmetry $P_4$, each of the receiving orifices 215a, 215b advantageously extends substantially in the central zone of the connecting element 203.

Each of these receiving orifices 215a, 215b is thus arranged on one or the other of the first or second lateral uprights 213a, 213b such that, for the one part, material of the corresponding lateral upright 213 remains above the receiving orifice 215, and such that, for the other part, material of the corresponding lateral upright 213 remains below the receiving orifice 215, between its lowest point and the upper face of the connecting element 203.

In order to allow the second shaft 103 that is secured to the intermediate piece 101 to be accommodated and held in the connecting element 203, that is to say, for example, simultaneously in the receiving orifices 215a, 215b that are arranged in the first and the second upright 213a, 213b, respectively, an inlet cutout 216 is formed in line with each of these receiving orifices 215, above the latter. The longitudinal dimension of each of the inlet cutouts 216 is less than the inside diameter of the receiving orifice 215 to which the inlet cutout 216 provides access and into which the inlet cutout 216 leads. In other words, each inlet cutout 216 forms an access cone to the corresponding receiving orifice 215. A first inlet cutout 216 thus forms an access cone to the first receiving orifice 215 arranged in the first lateral upright 213a, and a second inlet cutout 216 forms an access cone to the second receiving orifice 215 arranged in the second lateral upright 213b. Thus, when the second shaft 103 is accommodated simultaneously in the receiving orifices 215a and 215b, this second shaft 103 is then held therein. In order to make it easier to insert the second shaft 103 into the inlet cutouts 216 and to fit this second shaft 103 in the receiving orifices 215a, 215b, ramps 217 are formed on each of the inlet edges bordering each of the inlet cutouts 216. The smallest longitudinal dimension of the inlet cutout 216 is strictly less than the diameter of the second shaft 103.

The connecting element 203 may also have, within the internal volume delimited by the first and second lateral uprights 213a, 213b, a guide plate 218 which extends substantially longitudinally and vertically, parallel to the third plane of symmetry $P_3$. According to the embodiment illustrated in FIGS. 5 and 6, the guide plate 218 is positioned, in the transverse direction Oy, substantially its the median part of the internal volume delimited by the two lateral uprights 213.

The guide plate 218 is also advantageously positioned substantially centrally in the longitudinal direction of the connecting element 203. The guide plate 218 extends out of the internal volume delimited by the two lateral uprights 213 towards a distal end 219, the latter advantageously being provided with a cutout. The guide plate 218 comprises an upper face 220 which is domed in its central zone.

Referring to FIGS. 6 to 11, the intermediate piece 101 according to the invention comprises the first shaft 102 and the second shaft 103, which are offset with respect to one another. In other words, the intermediate piece 101 that is able to be disposed between the connector 8 and the driving arm 200 comprises two different rotation devices, advantageously with parallel axes. According to one embodiment of the invention, these rotation devices are the first shaft 102 and the second shaft 103. These shafts form male portions which protrude from each side of the intermediate piece 101, in the transverse direction Oy.

As illustrated in FIGS. 7 to 11, the intermediate piece 101 comprises for example a first bracket 104. The first bracket 104 is "U"-shaped in a cross section made in a fifth plane of symmetry $P_5$ which is a transverse plane of the intermediate piece 101. This transverse plane may for example pass through the axis of the first shaft 102, through the axis of the second shaft 103, or even through both of these axes.

More particularly, the first bracket 104 comprises a base 105 which forms the bottom of the "U" and two first longitudinal walls 106 which form the legs of the "U". The first longitudinal walls 106 are for example parallel to one another. The first longitudinal walls 106 are delimited by first external faces 107 which are also parallel to one another and are each provided with a first trunnion 108. The first trunnions 108 together form the first shaft 102 of the intermediate piece 101. The first trunnions 108 have a cylindrical, notably circular, shape and are able to be fitted into the receiving bearings 15a, 15b of the body 10 of the connector 8. This fitting is earned out by each first longitudinal wall 106 being inserted between a respective lateral wall 13a and the guide plate 18 of the connector 8. It will be noted that the first trunnions 108 protrude from the first longitudinal walls 106 towards the external environment of the intermediate piece 101.

Figure 7:
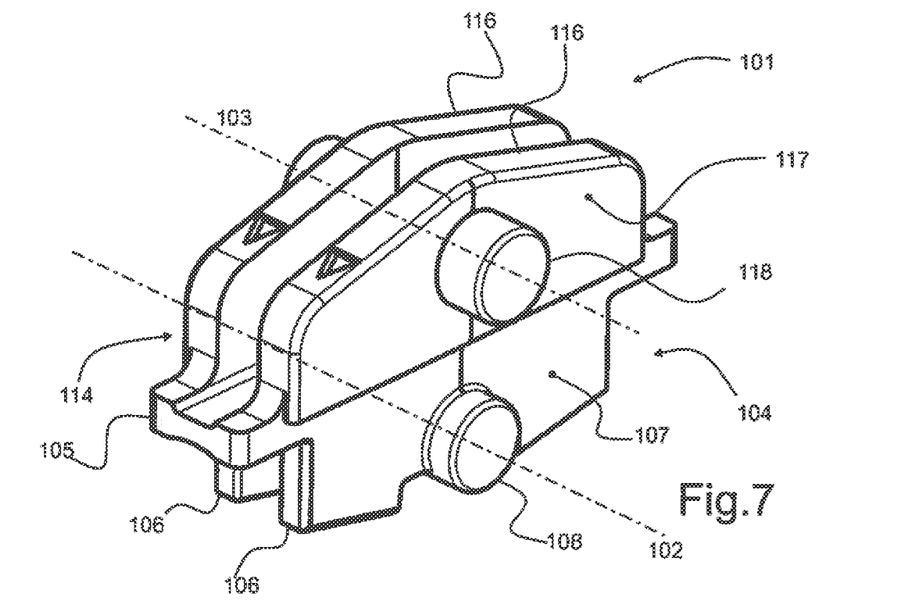
FIG. 7 is a perspective view of the intermediate piece according to the invention.
Figure 8:
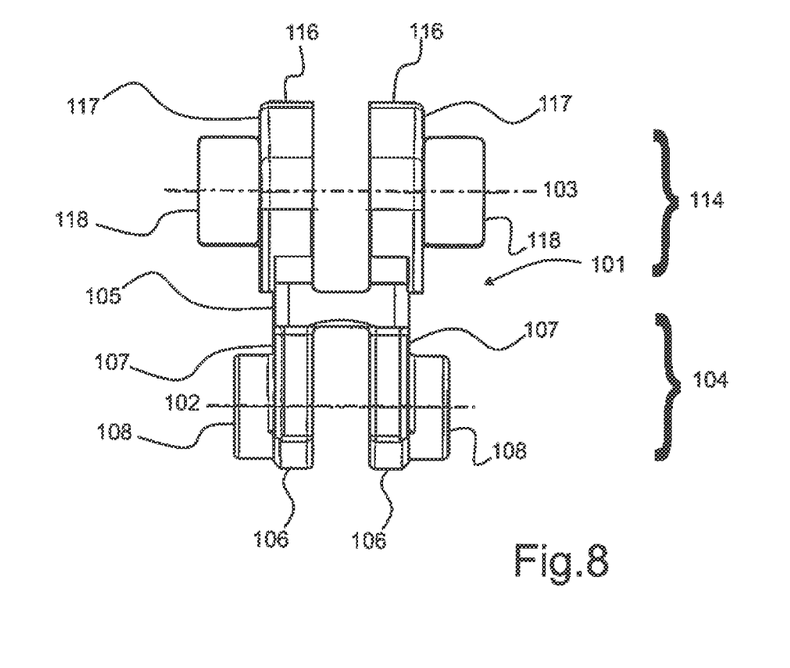
FIG. 8 is a side view of the intermediate piece illustrated in FIG. 7.
Figure 9:
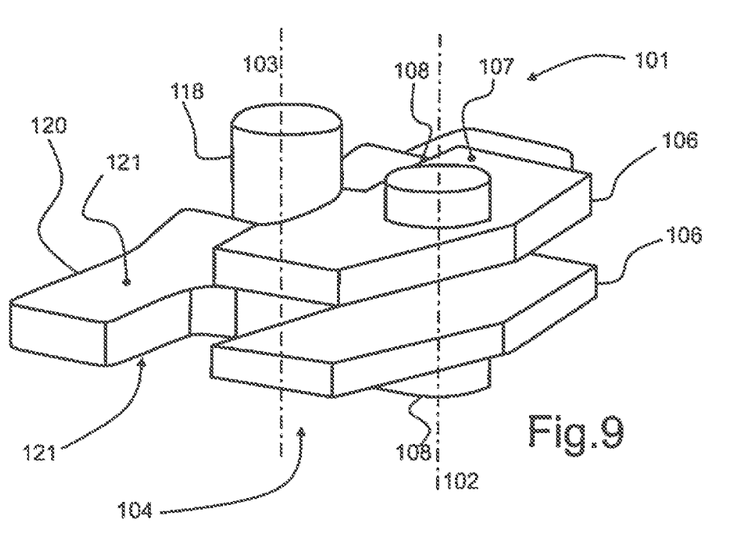
FIG. 9 is a perspective view of a first variant embodiment of the intermediate piece according to the invention.
Figure 10:
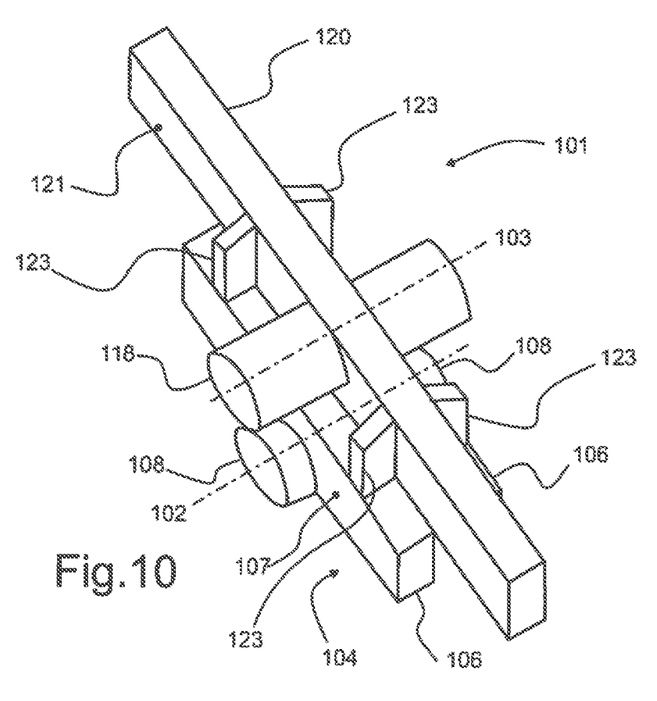
FIG. 10 is a perspective view of a second variant embodiment of the intermediate piece according to the invention.

Referring to FIGS. 6 to 8, the intermediate piece 101 can advantageously comprise a second bracket 114. The second bracket 114 is "U"-shaped in a cross section made in the fifth plane of symmetry $P_5$. More particularly, the second bracket 114 comprises a base which forms the base of the "U" and two second longitudinal walls 116 which form the legs of the "U". The second longitudinal walls 116 are notably parallel to one another. The second longitudinal walls 116 comprise second external faces 117 which are also parallel to one another and are each provided with a second trunnion 118. The second trunnions 118 together form the second shaft 103 of the intermediate piece 101. The second trunnions 118 have a cylindrical, notably circular, shape and are able to be fitted into the receiving orifices 215a, 215b of the connecting element 203 of the driving arm 2. This fitting is carried out by each second longitudinal wall 116 being inserted between a respective lateral upright 213 and the guide plate 218 of the connecting element 203 of the driving arm 2. The first bracket 104 and the second bracket 114 are joined together by way of the base 105, which is thus common to the first bracket 104 and to the second bracket 114. In other words, the first bracket 104 and the second bracket 114 are mounted head-to-tail with respect to one another, the first longitudinal walls 106 and the second longitudinal walls 116 being parallel to one another.

It will be noted that the first longitudinal walls 106 and the second longitudinal walls 116 can extend in coincident or different planes. Similarly, the diameter of the first trunnions 108 and the diameter of the second trunnions 118 can be identical or different. When the planes are coincident and the diameters are identical, the intermediate piece 101 has the advantage of being able to be mounted either in one direction or in the other. If not, the difference in planes and/or the difference in diameters can be used as a poka-yoke to oblige the user to mount the intermediate piece in one particular direction with respect to the wiper, and thus with respect to the driving arm.

Referring to FIGS. 9 to 12, the intermediate piece 101 according to a first variant embodiment can comprise a plate 120 which is also secured to the base 105. In this variant, the intermediate piece 101 is "Y"-shaped, the plate 520 forming the leg of the "Y" and the first bracket 104 forming the arms of the "Y". The plate 120 is provided parallel to the first longitudinal walls 106. The plate 120 is delimited by two external surfaces 121 that are parallel to one another. Each external surface 121 is provided with the second shaft 103, formed for example by the second trunnions 118. These second trunnions 118 together form the second shaft 103. In this variant, the connecting element 203 does not have a guide plate, such that the plate 120 is fitted between the two lateral uprights 213 of the connecting element 203.

The plate 120 has a distance measured longitudinally which is greater than a length of the first bracket 104, overhanging for example at each longitudinal end of the bracket 104. The plate 120 and the first bracket 104 are also connected together by reinforcements 123 which extend up the plate 120.

As a result of all of these arrangements, the connector 8, which comprises a type of female connection and carries the wiper 1, is able to be attached to a driving arm 2 provided with the connecting element 203, which is also of the female connection type, by way of an intermediate piece 101 of the present invention, comprising two types of male connection.

Figure 11:
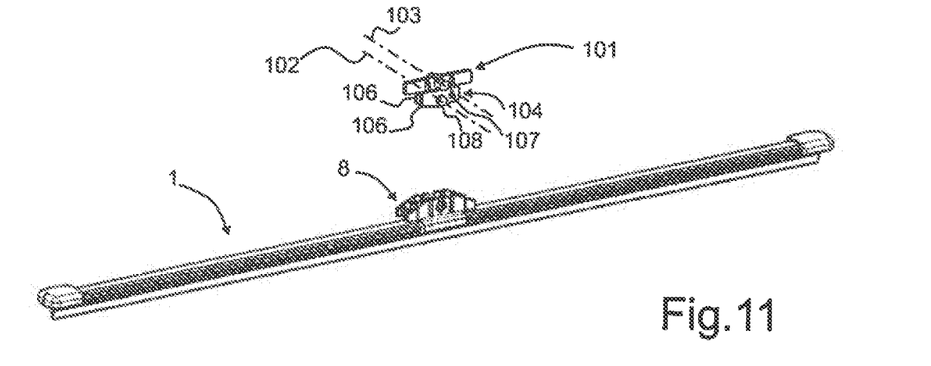
FIG. 11 is an exploded perspective view of the intermediate piece illustrated in FIG. 9 or 10 while it is being joined to the connector illustrated in FIGS. 2 to 4 that carries a wiper.
Figure 12:
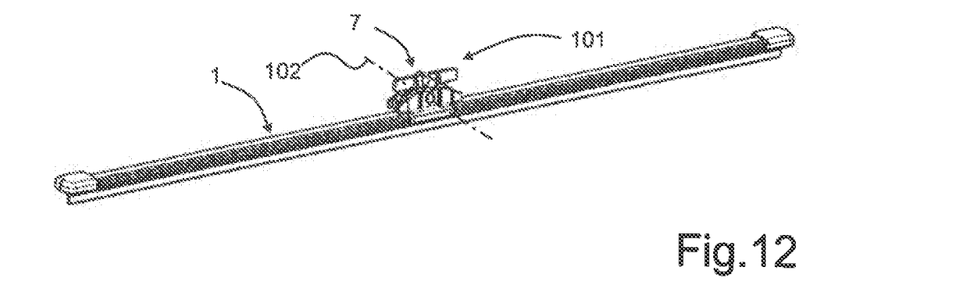
FIG. 12 is a perspective view of the components illustrated in FIG. 11 joined together.

FIGS. 11 and 12 show the intermediate piece 101 just before it is mounted on the connector 8, and this same intermediate piece 101 mounted on the connector 8, by cooperation of the first shaft 102, notably via the first trunnions 108, with the first and second bearings 15*a*, 15*b* of the connector 8.

In the above description, it will be noted that the intermediate piece 101 can be designed to allow exclusively a rotation between it and the driving arm. In such a case, the intermediate piece 101 comprises a means that prevents any rotation between the intermediate piece 101 and the connector 8 about the axis bearing the first shaft 102. Alternatively, the intermediate piece 101 can be designed to allow exclusively a rotation between it and the connector 8. In such a case, the intermediate piece 101 comprises a means that prevents any rotation between the intermediate piece 101 and the driving arm about the axis bearing the second shaft 103. According to yet another possibility, the intermediate piece 101 can be designed to allow a rotation between it and the driving arm and a rotation between it and the connector 8. Such an articulation may be advantageous.

The intermediate piece of the present invention is advantageously made of a polymeric material and is produced for example by moulding, notably by injection-moulding. This intermediate piece and its constituent parts are then in one piece.

The invention claimed is:

1. A wiper comprising:
   an intermediate piece; and
   a connector interposed between the intermediate piece and a structural element of the wiper,
   the intermediate piece configured to be interposed between the connector that is configured to carry a wiper and a connecting element of a driving arm, the connector is configured to be mounted rotationally on the intermediate piece and comprising at least one receiving bearing for receiving a first shaft, the connecting element comprising at least one receiving orifice for receiving a second shaft,
   the intermediate piece comprising:
      a first bracket that carries the first shaft,
         wherein the first bracket has a first "U"-shaped section and comprises a base from which at least two first longitudinal walls extend; and
      a second bracket that carries the second shaft,
         wherein the second bracket has a second "U"-shaped section and comprises the base from which at least two second longitudinal walls extend, and
         wherein the second bracket carries the second shaft through the second "U"-shaped section,
   wherein the first shaft and the second shaft are parallel to each other, and
   wherein the first bracket and the second bracket are rigidly coupled with each other.

2. The wiper according to claim 1, wherein the first shaft and the second shaft extend along different axes that are parallel to one another.

3. The wiper according to claim 1, wherein the shafts are able to form a male rotation means with regard to the connector and the connecting element for rotationally mounting the connector on the intermediate piece.

4. The wiper according to claim 1, wherein each first longitudinal wall is delimited by a first external face from which a first trunnion protrudes.

5. The wiper according to claim 4, wherein the first trunnions together form the first shaft.

6. The wiper according to claim 1, wherein each second longitudinal wall is delimited by a second external wall from which a second trunnion protrudes.

7. The wiper according to claim 6, wherein the second trunnions together form the second shaft.

8. The wiper according to claim 1, wherein the first bracket and the second bracket are mounted head-to-tail by way of the base that is common to the two brackets.

9. The wiper according to claim 8, wherein the first bracket, the second bracket, the first shaft and the second shaft form a single piece produced in one and the same manufacturing operation.

10. A wiping system comprising:
    a wiper comprising an intermediate piece configured to be interposed between a connector that is configured to carry a wiper and a connecting element of a driving arm, the connector is configured to be mounted rotationally on the intermediate piece comprising at least one receiving bearing for receiving a first shaft, the connecting element comprising at least one receiving orifice for receiving a second shaft,
    the intermediate piece comprising:
       a first bracket that carries the first shaft,
          wherein the first bracket has a first "U"-shaped section and comprises a base from which at least two first longitudinal walls extend; and
       a second bracket that carries the second shaft, wherein the second bracket has a second "U"-shaped section and comprises the base from which at least two second longitudinal walls extend, and
wherein the second bracket carries the second shaft through the second "U"-shaped section,
wherein the first shaft and the second shaft are parallel to each other, and
wherein the first bracket and the second bracket are rigidly coupled with each other; and
a driving arm that drives the wiper in rotation.

* * * * *